Inventor
Gerard A. DeVlieg
Andrew F. Wintercorn
Atty

Inventor
Gerard A. DeVlieg
Andrew F. Wintercorn
Atty

Patented June 6, 1950

2,510,387

UNITED STATES PATENT OFFICE 2,510,387

LAWN TRIMMER

Gerard A. De Vlieg, San Diego, Calif.

Application August 2, 1945, Serial No. 608,395

11 Claims. (Cl. 56—249)

This invention relates to a device similar to a lawn mower, but especially designed and adapted for trimming along walls, fences, sidewalks and other places where the ordinary mower cannot reach, whereby to eliminate the necessity for doing such work laboriously with a pair of shears.

I am aware such modified forms of lawn mowers suited for trimming purposes have been proposed heretofore, but they have not, as a rule, been successful, because they lacked facilities for deflecting the grass away from the wall or fence into the path of the cutting reel, and as a result it was impossible to do a good clean job without following up the mower with hand shears. Furthermore, in most cases the mower was so designed that unless it was run parallel to the wall it would not operate properly, and under such conditions there was insufficient handle clearance for comfort. It is, therefore, the principal object of my invention to provide a trimming lawn mower equipped with a grass-deflecting finger which positively deflects the blades of grass into the path of the reel for cutting, the finger being part of a swivel plate which permits the mower to be run at an acute angle to a wall or fence which might otherwise tend to make the operation awkward and tiring, and there being a roller on the swivel plate to contact the surface along which the mower is operated to prevent scuffing and make for easier operation.

The invention is illustrated in the accompanying drawings, in which.

The same reference numerals are applied to corresponding parts throughout the views.

Figure 1:
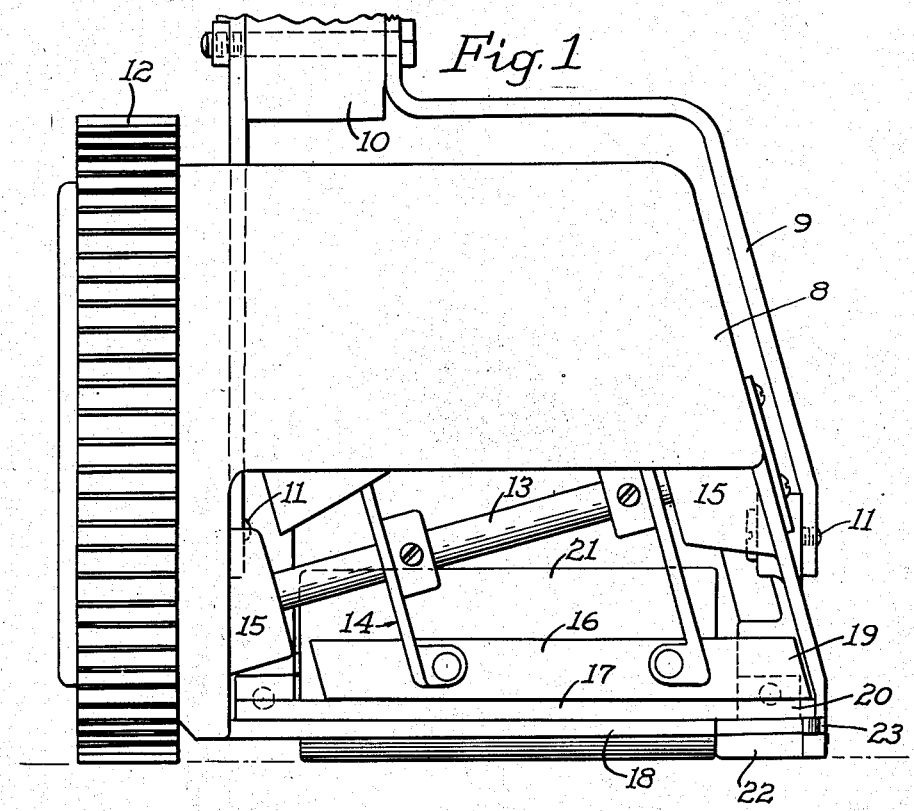
Figs. 1 and 2 are front and side views, respectively, of a lawn mower embodying my invention.
Figure 3:
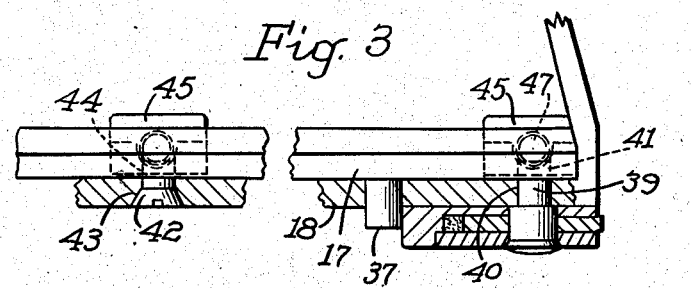
Fig. 3 is a sectional detail on a slightly enlarged scale taken on the line 3—3 of Fig. 2.
Figure 4:
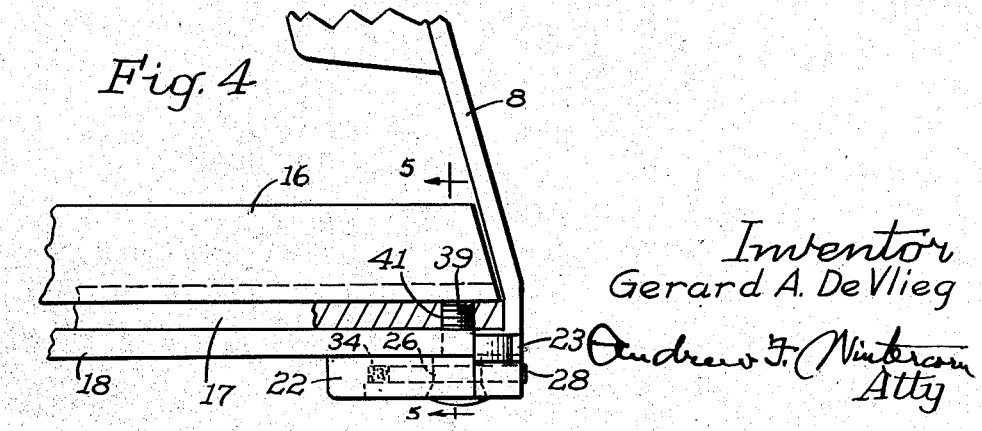
Fig. 4 is a front elevational detail on the same scale as Fig. 3 to better illustrate the relationship between the grass-deflecting finger and the cutter-bar and reel.
Figure 2:
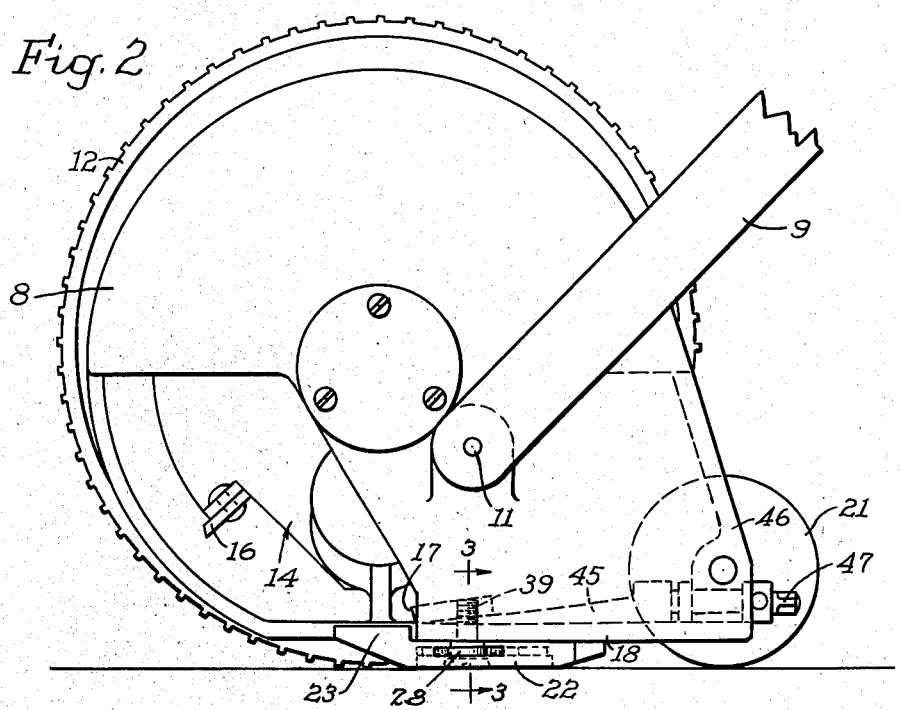
Figure 5:
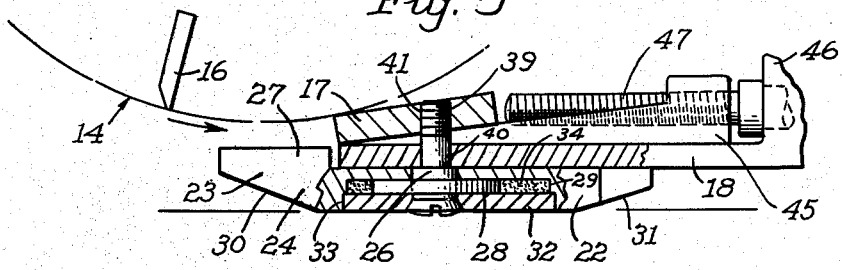
Fig. 5 is a cross-section on the line 5—5 of Fig. 4.

The present mower comprises a one-piece frame 8, to which the fork 9 on the lower end of a handle 10 is pivotally connected, as indicated at 11. A single traction wheel 12 is suitably mounted on one end of the frame 8 and the inclined shaft 13 extends into the lower portion thereof and is driven thereby in any suitable or preferred manner to transmit drive to the reel 14, the shaft 13 being suitably supported in bearings 15 on the frame. The blades 16 of the reel cooperate with a cutter-bar 17 suitably mounted on the bottom wall 18 of the frame. It is clear from an inspection of Fig. 1 that by virtue of the fact that the reel 14 is tapered and its drive shaft 13 is inclined, the blades 16 of the reel in cooperating with the cutter-bar 17 have their outer end portions 19 that cooperate with the outer end portions 20 of the cutter-bar working beyond the end of the shaft 13, whereby to permit cutting grass along a wall, or fence, or upwardly projecting walk where an ordinary lawn mower would not reach. A ground roller 21 is suitably mounted in the frame 8 in rearwardly spaced relation to the cutter-bar 17 to support the frame at a predetermined elevation with respect to the ground and accordingly determine the cutting height of the mower. No invention is claimed in the mower details described thus far, excepting only insofar as they form a part of the novel combination hereinafter described and claimed.

Figure 6:
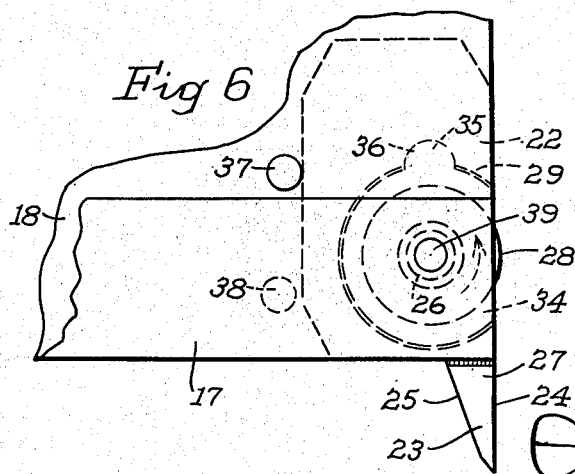
Fig. 6 is a plan view of the cutter-bar and swivel plate.
Figure 7:
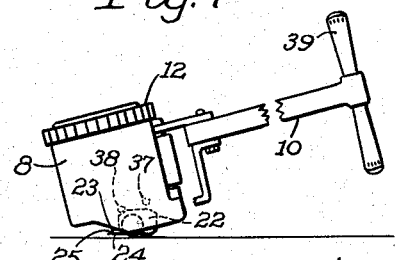
Fig. 7 is a plan view of the mower on a reduced scale, illustrating the mode of operation.

A swivel plate 22 is provided on the bottom of the frame 8 under the outer end portion 20 of the cutter-bar having a grass-deflecting finger 23 extending forwardly and upwardly therefrom, arranged so that its flat outer side 24 will slide along the wall or walk along which the mower is being operated, whereby to deflect the blades of grass away from the wall or walk by their sliding contact with the angular inner side 25 of the finger and accordingly bring these blades of grass directly into the path of the end portions 19 of the reel blades 16. In that way, there will be no danger of the mower not reaching all of the grass and leaving a narrow file along the wall or walk that would require the use of hand shears if a good clean job is to be done. The swivel plate 22 is pivoted on a stud 26 below the bottom wall 18 of the frame, but the finger 23 is of increased thickness, as indicated by the upwardly projecting portion 27 in front of the bottom wall 18, so as to present a wide enough side face 25 to the grass in as close proximity to the reel blades 16, as possible, to insure a good and effective guiding action. A roller 28 is mounted on the stud 26 in a circular recess 29 provided therefor in the bottom of the swivel plate and projects from the side of the swivel plate sufficiently to insure good rolling contact on the side of the wall or walk along which the mower is being operated, and thus reduce scuffing and make for easier operation. The upwardly inclined surfaces 30 and 31 on the front and rear ends of the swivel plate give a sled-runner effect in either direction of mower movement and reduce likelihood of gouging. A cover plate 32 fits into a radially enlarged portion 33 of the recess 29 and lies flush with the bottom of the plate 22, and there is a felt washer 34 fitting closely in the recess 29 and closely surrounding the periphery of the roller 28 to exclude dirt from the recess 29 in the operation of the mower. A lug 35 is provided on the washer 34 fitting in a recess 36 in the plate 22 to hold the washer 34 against turning and keep it in the desired position. The swivel action of the plate 22 is limited by two pins 37 and 38 which project downwardly from the bottom wall 18 of the frame and, as clearly appears in Fig. 6, when the swivel plate is in contact with the pin 37 its outer side 24 is parallel to the side of the frame 8. However, as appears in Fig. 7, when the swivel plate is in contact with the pin 38, the finger 23 projects inwardly in acute angular relation to the side of the frame 8 of the mower but is disposed substantially parallel to the side of the wall or walk along which the mower is being operated. In that way, the operator has ample clearance for the handle-bar 39 on the end of the handle 10, and the operation is not awkward and tiring, as it would otherwise be. It is clear from a study of Fig. 6 that the roller 28 turns in a counter-clockwise direction in the forward movement of the mower as it rolls along the side of a wall or walk, and, hence, it tends to keep the swivel plate 22 in contact with the pin 37 by reason of the rubbing contact of the felt washer 34 on the roller.

The stud 26 is preferably an enlarged portion on the head end of a screw 39 that extends through a hole 40 in the bottom wall 18 of the frame and threads in a hole 41 provided in the cutter-bar 17, whereby to utilize the one screw for several purposes. Another screw 42 entered in a hole 43 in the bottom wall 18, near the other end of the cutter-bar 17, threads in a hole 44 in the cutter-bar to fasten that end thereof. Two wedges 45 are adjustable forwardly relative to flanges 46 on the side walls of the frame by means of screws 47 to change the elevation of the opposite ends of the cutter-bar 17 with respect to the bottom wall 18 of the frame, and accordingly alter the cutting clearance between the cutter-bar 17 and the blades 16 of the reel 14. Prior to the adjustment of the screws 47, the screws 39 and 42 are loosened a half turn or so, depending upon the extent of the cutter-bar adjustment required, after which the screws 47 are adjusted to adjust the wedge 45 forwardly to the necessary extent, and then the screws 39 and 42 are tightened again.

It is believed the foregoing description conveys a good understanding of the objects and advantages of my invention. The appended claims have been drawn to cover all legitimate modifications and adaptations.

I claim:

1. In a lawn mower comprising a stationary cutter-bar and rotary cutters cooperating therewith, said cutter-bar having an elongated non-gouging finger element that is oscillatably mounted on a vertical axis between its ends relative to and projects forwardly from an end of said cutter-bar in a substantially horizontal plane below the outer end portion and substantially wholly within the length of the stationary cutter-bar and rotary cutters and approximately at the level of the ground, for the sole purpose of deflecting blades of grass laterally into the path of operation of the adjacent end portion of said cutter-bar and rotary cutters, and means positively limiting the oscillatory movement of said finger relative to said cutter-bar.

2. In a lawn mower comprising a frame carrying a stationary cutter-bar, and rotary cutters cooperating with the latter, said frame having a substantially horizontal elongated plate oscillatably mounted between its ends on a vertical axis on said frame under and substantially wholly within the length of the outer end portion of the cutter-bar and approximately at the level of the ground, said plate having a finger projecting horizontally forwardly therefrom and from the end of the cutter-bar for the sole purpose of deflecting blades of grass laterally inwardly into the path of operation of the adjacent end portion of said cutter-bar and rotary cutters, a roller mounted to turn on the axis of oscillation of said plate and protruding from the outer side of the plate to run on the substantially vertical side of a walk or wall along which the mower is operated, and means positively limiting oscillatory movement of said plate relative to said frame.

3. In a lawn mower comprising a frame carrying a stationary cutter-bar, and rotary cutters cooperating with the latter, said frame having a substantially horizontal elongated plate pivotally mounted between its front and rear ends on a substantially vertical axis on said frame under and substantially wholly within the length of the outer end portion of the cutter-bar and approximately at the level of the ground, said plate having a finger projecting horizontally forwardly therefrom and from the end of the cutter-bar for the sole purpose of deflecting blades of grass laterally inwardly into the path of operation of the adjacent end portion of said cutter-bar and rotary cutters, means to limit pivotal movement of said plate relative to said frame within a predetermined small angle at the outward limit of which the outer side of the grass deflecting finger lies substantially parallel with the end of the cutter-bar, and means tending to swing said plate toward said outward limit position.

4. In a lawn mower comprising a frame carrying a stationary cutter-bar, and rotary cutters cooperating with the latter, said frame having a substantially horizontal elongated plate pivotally mounted between its front and rear ends on a substantially vertical axis on said frame under and substantially wholly within the length of the outer end portion of the cutter-bar and approximately at the level of the ground, said plate having a finger projecting horizontally forwardly therefrom and from the end of the cutter-bar for the sole purpose of deflecting blades of grass laterally inwardly into the path of operation of the adjacent end portion of said cutter-bar and rotary cutters, a roller projecting from the outer edge portion of the plate for rolling contact on the substantially vertical side of a wall or walk along which said finger is moved in the operation of the mower, said roller operating on the same vertical pivotal axis as said plate, means to limit pivotal movement of said plate relative to said frame within a predetermined small angle at the outward limit of which the outer side of the grass deflecting finger lies substantially parallel with the end of the cutter-bar, and means carried by said plate frictionally engaging said roller tending to swing said plate toward said outward limit position.

5. In a lawn mower comprising a frame carrying a stationary cutter-bar, and rotary cutters cooperating with the latter, said frame having a substantially horizontal elongated plate oscillatably mounted between its ends on a substantially vertical axis on said frame under and substantially wholly within the length of the outer end portion of the cutter-bar and approximately at the level of the ground, said plate having a finger projecting horizontally forwardly therefrom and from the end of the cutter-bar for the sole purpose of deflecting blades of grass laterally inwardly into the path of operation of the adjacent end portion of said cutter-bar and rotary cutters, the bottom of the front end portion of said finger being formed with a forward and upward inclination for a sled-runner sliding action on the ground in the forward movement of the mower.

6. In a lawn mower comprising a frame carrying a stationary cutter-bar, and rotary cutters cooperating with the latter, said frame having a substantially horizontal elongated plate oscillatably mounted between its ends on a substantially vertical axis on said frame under and substantially wholly within the length of the outer end portion of the cutter-bar and approximately at the level of the ground, said plate having a finger projecting horizontally forwardly therefrom and from the end of the cutter-bar for the sole purpose of deflecting blades of grass laterally inwardly into the path of operation of the adjacent end portion of said cutter-bar and rotary cutters, the bottom of the front end portion of said finger being formed with a forward and upward inclination for a sled-runner sliding action on the ground in the forward movement of the mower, the bottom of the rear end portion of said plate being formed with a rearward and upward inclination for a sled-runner sliding action on the ground in the rearward movement of the mower.

7. In a lawn mower comprising a frame carrying a stationary cutter-bar, and rotary cutters cooperating with the latter, said frame having a substantially horizontal elongated plate pivotally mounted between its ends on a substantially vertical axis on said frame under and substantially wholly within the length of the outer end portion of the cutter-bar and approximately at the level of the ground, said plate having a finger projecting horizontally forwardly therefrom and from the end of the cutter-bar for the sole purpose of deflecting blades of grass laterally inwardly into the path of operation of the adjacent end portion of said cutter-bar and rotary cutters, a roller projecting from the outer edge portion of the plate for rolling contact on the substantially vertical side of a wall or walk along which said finger is moved in the operation of the mower, said roller operating on the same vertical pivotal axis as said plate, said plate having a recess provided therein for accommodation of said roller that is larger in radius than said roller, and a wiper in said recess contacting the peripheral portion of said roller to wipe off dirt therefrom and thereby also yieldingly urge said plate to turn in a direction yieldingly engaging said finger with the aforesaid side of the wall or walk along which the mower is operated.

8. In a lawn mower comprising a horizontal frame member carrying a cutter-bar, and rotary cutters adapted to cooperate with said cutter-bar, said frame member having a swivel plate under it beneath and substantially wholly within the length of one end portion of said cutter-bar and approximately at the level of the ground, a grass deflecting finger projecting horizontally forwardly from said plate in front of the cutter-bar for the sole purpose of deflecting blades of grass laterally inwardly into the path of operation of the adjacent end portion of said cutter-bar and rotary cutters, a screw member for pivotally supporting said plate extending upwardly through said frame member and threaded into an opening provided therefor in the adjacent end of said cutter-bar to fasten the same to said frame member, means positively limiting oscillation of said plate relative to said frame member, and means cooperating with the rest of the cutter-bar for fastening the same to said frame member.

9. A lawn mower structure as set forth in claim 8, including a roller rotatably mounted on said screw member and projecting laterally from said swivel plate to run on the side substantially vertical of a wall or walk along which the mower is being operated.

10. A lawn mower structure as set forth in claim 8, including a roller rotatably mounted on said screw member and projecting laterally from said swivel plate to run on the substantially vertical side of a wall or walk along which the mower is being operated, said plate having a recess provided therein to accommodate said roller with space left around the periphery of the roller in said plate for a washer of yieldable material and being recessed further to receive a closure plate beneath said roller, a partial ring of yieldable washer material in said first recess enclosing the periphery of the roller, and a closure plate in said latter recess having an opening provided therein in which the head end portion of said screw member is received whereby to retain the closure plate in the recess.

11. In a lawn mower comprising a frame carrying a stationary cutter-bar, and rotary cutters cooperating with the latter, said frame having a substantially horizontal elongated plate pivotally mounted between its front and rear ends on a substantial vertical axis on said frame under and substantially wholly within the length of the outer end portion of the cutter-bar and approximately at the level of the ground, said plate having a finger projecting horizontally forward therefrom and from the end of the cutter-bar for the sole purpose of deflecting blades of grass laterally inwardly into the path of operation of the adjacent end portion of said cutter-bar and rotary cutters, means to limit pivotal movement of said plate relative to said frame within a predetermined small angle at the outward limit of which the outer side of the grass deflecting finger lies substantially parallel with the end of the cutter-bar, and a roller operating on the same vertical pivotal axis as said plate and projecting from the outer edge portion of the plate for rolling contact on the substantially vertical side of a wall or walk along which said finger is moved in the operation of the mower, said roller being so arranged with relation to said plate to exert a frictional drag on the plate tending to swing said plate toward the aforesaid limit position.

GERARD A. DE VLIEG.

REFERENCES CITED

The following references are of record in the file of this patent:

UNITED STATES PATENTS

| Number | Name | Date |
|---|---|---|
| 891,867 | Secrest | June 30, 1908 |
| 956,601 | Potter | May 3, 1910 |
| 1,707,819 | Smith | Apr. 2, 1929 |
| 1,814,991 | Wetmore | July 14, 1931 |
| 2,116,829 | Hoerner | May 10, 1938 |

Certificate of Correction

June 6, 1950

Patent No. 2,510,387

GERARD A. DE VLIEG

It is hereby certified that errors appear in the printed specification of the above numbered patent requiring correction as follows:

Column 6, line 11, strike out the word "side" and insert the same after the syllable "tical" in line 12, same column;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*